(12) United States Patent
Jiang

(10) Patent No.: US 7,935,255 B2
(45) Date of Patent: May 3, 2011

(54) FILTER CARTRIDGE

(75) Inventor: Zemin Jiang, Cookeville, TN (US)

(73) Assignee: Cummins Filtration IP, Inc., Minneapolis, MN (US)

(*) Notice: Subject to any disclaimer, the term of this patent is extended or adjusted under 35 U.S.C. 154(b) by 423 days.

(21) Appl. No.: 11/851,033

(22) Filed: Sep. 6, 2007

(65) Prior Publication Data
US 2009/0065427 A1 Mar. 12, 2009

(51) Int. Cl.
*C02F 9/00* (2006.01)
*B01D 27/00* (2006.01)

(52) U.S. Cl. ........ 210/338; 210/337; 210/335; 210/342; 210/314; 210/315; 210/256

(58) Field of Classification Search ............ 210/337, 210/338, 458, 256, 335, 342
See application file for complete search history.

(56) References Cited

U.S. PATENT DOCUMENTS

| | | | |
|---|---|---|---|
| 2,962,121 A * | 11/1960 | Wilber | 55/480 |
| 3,262,563 A * | 7/1966 | Pall | 210/90 |
| 5,656,159 A | 8/1997 | Spencer et al. | |
| 5,846,417 A | 12/1998 | Jiang et al. | |
| 6,254,788 B1 | 7/2001 | Davidson | |
| 6,627,078 B1 * | 9/2003 | Wagner et al. | 210/238 |
| 6,884,349 B1 | 4/2005 | Jiang | |
| 7,033,497 B1 | 4/2006 | Yamaguchi et al. | |
| 2006/0065607 A1 * | 3/2006 | Bassett et al. | 210/767 |

FOREIGN PATENT DOCUMENTS

JP 8-71541 A 3/1996

OTHER PUBLICATIONS

U.S. Appl. No. 11/780,176, filed Jul. 19, 2007, title: Standpipe With Flow Restriction Valve, and Filter Cartridge, inventor Zemin Jiang, 37 pages.
U.S. Appl. No. 11/937,700, filed Nov. 9, 2007, title: Standpipe With Flow Restriction Valve, and Filter Cartridge, inventor Zemin Jiang, 37 pages.
International Search Report of PCT/US2008/064967, dated Oct. 28, 2008.
Written Opinion of the International Searching Authority of PCT/US2008/064967, dated Oct. 28, 2008.

* cited by examiner

*Primary Examiner* — Krishnan S Menon
*Assistant Examiner* — Benjamin Kurtz
(74) *Attorney, Agent, or Firm* — Hamre, Schumann, Mueller & Larson, P.C.; J. Bruce Schelkopf

(57) ABSTRACT

A filter cartridge configured as a filter-in-filter design with an inner filter and an outer filter. The filter cartridge has features, for example an overhanging lip, to engage with a lid of a filter housing in which the cartridge is installed such that the lid is connected to the cartridge. As a result, the cartridge can be connected to the lid to facilitate installation and removal of the cartridge. Alternatively, the same features that allow connection with the lid permit a user to manually grasp the cartridge during installation and removal so that the cartridge can be used without a lid having attachment features. The filter cartridge is also designed to enable use of a longer inner filter within the outer filter. A longer inner filter increases the amount of filter media available for filtering the fluid.

9 Claims, 7 Drawing Sheets

FILTER CARTRIDGE

FIELD

This disclosure generally pertains to the field of filtration, and more particularly to a filter cartridge for use in filtration systems, for example a fuel filtration system.

BACKGROUND

Filter cartridges are used in a number of different technologies to filter a fluid. One example of a filter cartridge is a fuel filter cartridge used in a fuel filtration system.

Filter cartridges can be constructed with a single filter media, or with multiple filter media, for example as a filter-in-filter design that uses an inner filter media disposed inside of an outer filter media. A filter-in-filter design can provide a high particle filtration efficiency and high fuel/water separation through a wide range of fuel interfacial values.

SUMMARY

A filter cartridge for use in filtering fluids, for example fuel, lubrication, hydraulic and other liquids, as well as air. A number of different uses for the filter cartridge are possible. For example, in one embodiment, the filter cartridge can be used in a "no filter, no run" filtration system that verifies that the filter cartridge is present to safe-guard against damage to fuel injectors, associated fuel components, etc. and engine malfunctions. In such a filtration system, fuel flow to the engine is prevented altogether or permitted in an amount insufficient to allow engine operation if the filter cartridge is not installed, and an appropriately designed filter cartridge is required to be used in order to permit sufficient fuel flow for engine operation.

In the embodiment described herein, the filter cartridge is a filter-in-filter design with an inner filter and an outer filter. The filter cartridge is designed with features to engage with a lid of a filter housing in which the cartridge is installed such that the lid is connected to the cartridge. As a result, the cartridge is connected to the lid to facilitate installation and removal of the cartridge. Alternatively, the same features that allow engagement with the lid permit a user to manually grasp the cartridge during installation and removal so that the cartridge can be used without a lid having attachment features.

The filter cartridge is also designed to enable use of a longer inner filter within the outer filter. A longer inner filter increases the amount of filter media available for filtering the fluid.

In one embodiment, the filter cartridge includes an outer filter having first filter media with an upper end and a bottom end, a first end plate connected to the upper end of the first filter media, and a second end plate connected to the bottom end of the first filter media, the outer filter including a central axis. The first end plate includes a generally circular, horizontal plate and a flange that extends downwardly from the plate. The plate and the flange defining an open area, and the plate has an edge that extends radially past the flange to define a lip. The lip permits connection to suitable features on the lid as well as allows manual grasping of the cartridge. The filter cartridge also includes an inner filter having second filter media with an upper end and a bottom end, a first end plate connected to the upper end of the second filter media, and a second end plate connected to the bottom end of the second filter media. The second filter media is disposed within the first filter media, and the first end plate of the inner filter and the upper end of the inner filter are disposed within the open area.

The filter housing lid can include a plurality of resilient fingers that project downwardly therefrom at respective positions for engagement with the lip on the first end plate of the outer filter to enable connection of the lid to the outer filter.

DETAILED DESCRIPTION

The disclosure in U.S. patent application Ser. No. 11/780,176, filed on Jul. 19, 2007, and entitled "Standpipe With Flow Restriction Valve, and Filter Cartridge", is incorporated herein by reference in its entirety.

Figure 1:
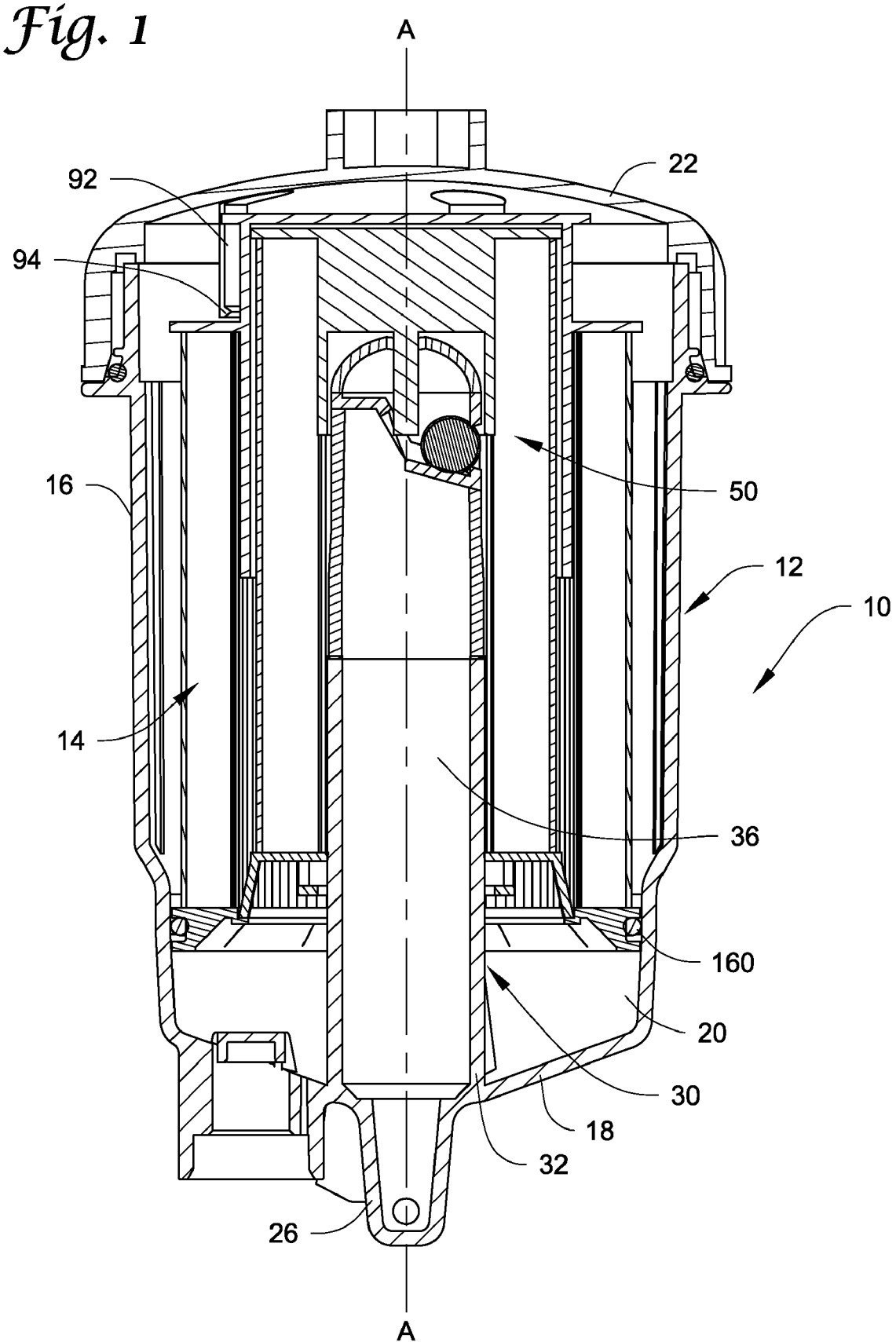
FIG. 1 is a sectional view of a filter assembly that includes a filter cartridge in a filter housing.

FIG. 1 illustrates a filter assembly 10, for example a fuel filter assembly, which is intended to filter a fluid, for example diesel fuel, and remove water from the fluid before the fluid reaches a protected system, for example a fuel injection pump and fuel injectors. This description will hereinafter describe the fluid as fuel. However, it is to be realized that the concepts described herein can be used for other fluids. In addition, in appropriate circumstances, the concepts described herein can be used to remove contaminants other than water from the fluid. And, in appropriate circumstances, one or more of the concepts described herein can be applied to other types of filter assemblies that filter other types of fluids, for example lubrication, hydraulic and other liquids, as well as air.

The assembly 10 includes a filter housing 12 that is designed to receive a filter cartridge 14 therein for filtering the fluid. The filter housing 12 includes a housing body that has a side wall 16 and an end wall 18. The side wall 16 and the end wall 18 define a filter cartridge space 20 that is large enough to receive the filter cartridge 14 therein, with the end wall 18 forming a closed end of the space 20. The housing body has an open end generally opposite the end wall 18, with the open end in use being closed by a lid 22 that closes off the space 20. The housing body also includes an inlet opening 24 (FIG. 2) through which fuel to be filtered enters the space 20, and an outlet 26, illustrated as extending from the end wall 18, through which fuel exits on its way to the engine. It is to be realized that the filter housing 12 could have other configurations than that described herein.

A fluid passageway member in the form of a standpipe 30 is secured to the end wall 18 and extends upwardly into the space 20 toward the open end and the cap 22. In the illustrated embodiment, the standpipe 30 is generally hollow from its end 32 connected to the end wall 18 to a tip end thereof, thereby defining an internal flow passage 36. The flow passage 36 is in communication with the outlet 26 so that fuel that enters the standpipe 30 can flow from the standpipe and into the outlet 26 to the engine. The standpipe 30 is disposed in the housing 12 which has a central axis A-A. In some embodiments, the axis A-A of the housing 12 can be off-center of the housing.

The standpipe 30 can have a number of cross-sectional shapes, for example oval-shaped or circular. An example of an oval standpipe is disclosed in U.S. Pat. No. 6,884,349 and in U.S. patent application Ser. No. 11/780,176.

A flow restriction valve 50 is disposed at the tip end of the standpipe 30 to control the flow of fuel into the standpipe. The valve 50 can prevent fuel flow into the standpipe when the filter cartridge 14 is not installed or when an incorrect filter cartridge is installed. When the filter cartridge 14 or other appropriately designed filter cartridge is installed, the filter cartridge is designed to interact with the valve in such a manner as to keep the valve from preventing fuel flow into the standpipe. An example of a valve operating in this manner is disclosed in U.S. Pat. No. 6,884,349 and in U.S. patent application Ser. No. 11/780,176.

Figure 2:
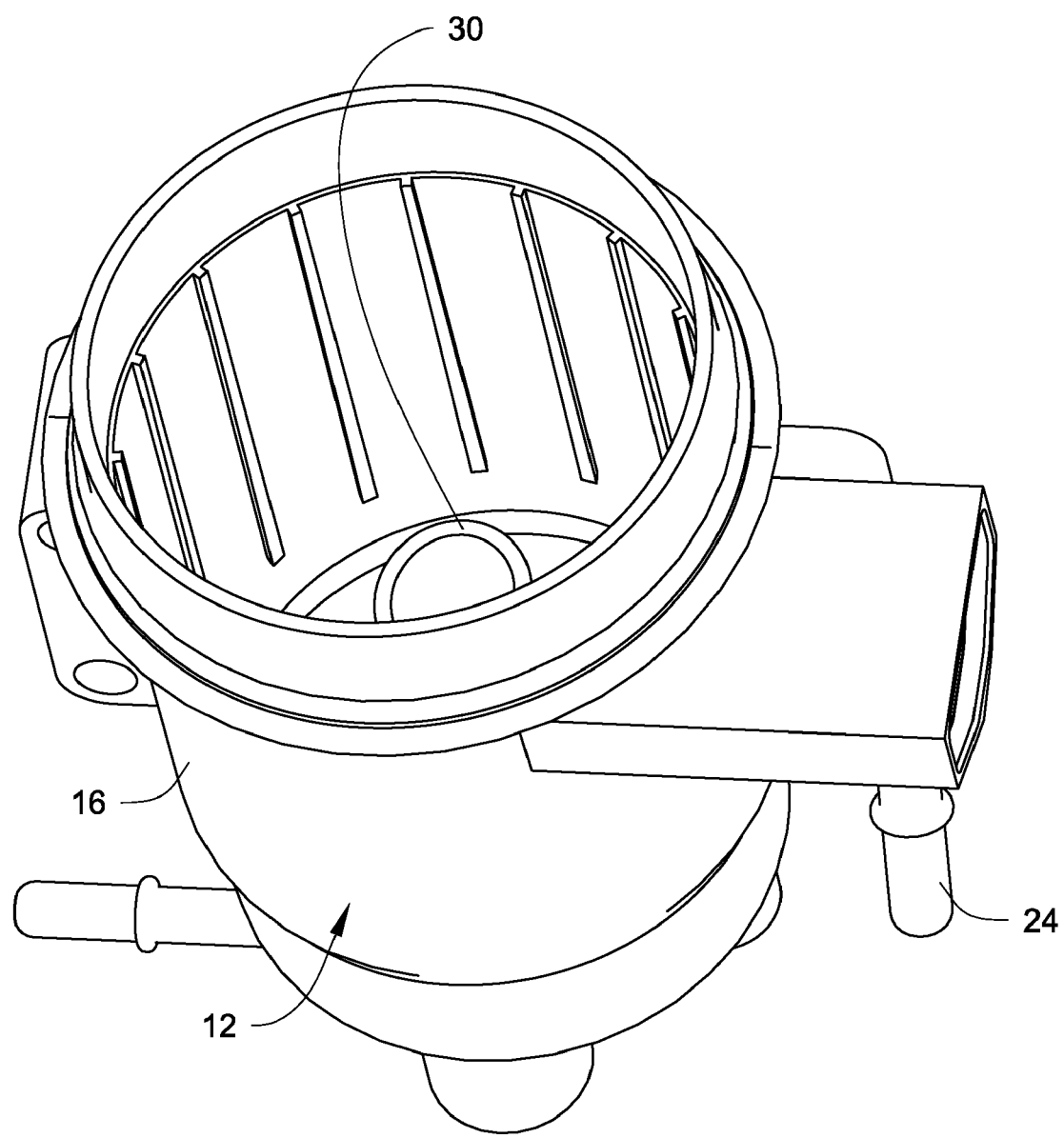
FIG. 2 is a perspective view of the filter housing with the lid removed to show the interior of the housing.
Figure 3:
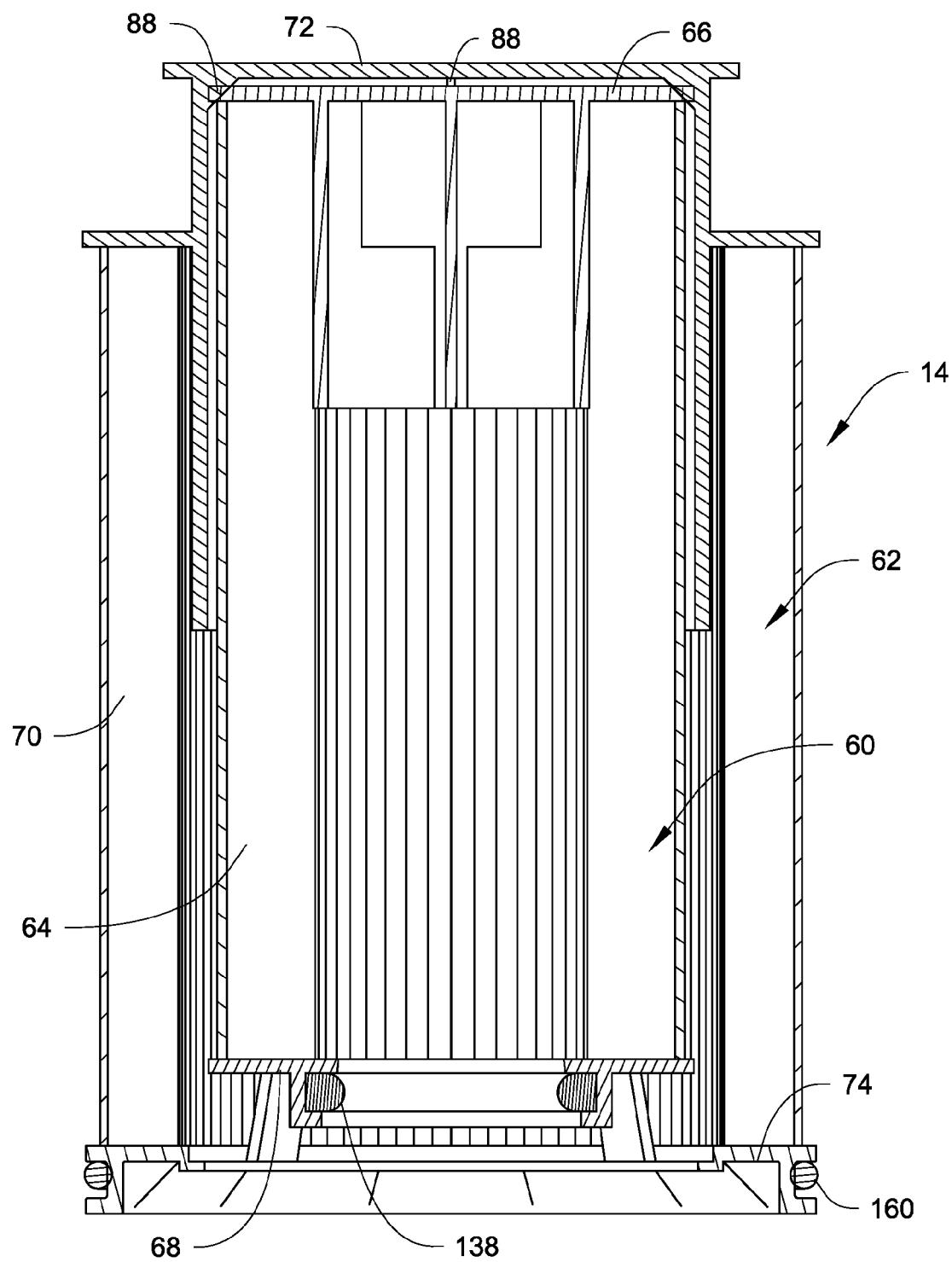
FIG. 3 is a detailed cross-sectional view of the filter cartridge.

With reference to FIGS. 1-3, the filter cartridge 14 is illustrated as being of a filter-in-filter type with an inner filter 60 and an outer filter 62. The inner filter 60 is designed to snap-fit connect with the outer filter 62 during assembly of the cartridge 14 to form an integral unit.

The inner filter 60 includes a ring of filter media 64, an upper end plate 66 secured to an upper end of the media 64, and a lower end plate 68 secured to a bottom end of the media 64. Likewise, the outer filter 62 includes a ring of filter media 70, an upper end plate 72 secured to an upper end of the media 70, and a lower end plate 74 secured to a bottom end of the media 70. The end plates 66, 68, 72, 74 are formed of a suitable material, for example plastic.

Fuel can include water therein in different forms, including free water, e.g. droplets, and emulsified water. Preferably, the filter media 70 is designed so that free water is initially stripped out when fuel enters the filter from the outside. The free water does not penetrate the media 70 and remains substantially outside the filter. The media 70 also coalesces the majority of the emulsified water and separates the now coalesced water from the fuel. The media 70 also retains soft and solid contaminants from the fuel. Water, being heavier than fuel, settles down to the bottom of the filter cartridge 14, and drains through openings to a water collection area at the base of the housing 12. By the time the fuel interfaces with the media 64, most of the water has been separated, and the media 64 filters particles from the fuel before the fuel enters the center of the filter cartridge. The media 64 also strips remaining water from the fuel and prevents the water from entering the media 64. The filtered fuel then enters the standpipe 30 and flows to the outlet 26, leading to a downstream protected component, for example a fuel pump.

The outside of the filter media 64 generally faces the interior of the filter media 70 of the filter 62, with the inside of the ring of media 64 defining a clean or filtered fuel side of the filter cartridge 14 and the outside of the media 70 defining a dirty or unfiltered fuel side, whereby the filter cartridge is configured for outside-in flow. In appropriate circumstances, the concepts described herein can be applied to inside-out type flow filter cartridges.

Figure 4:
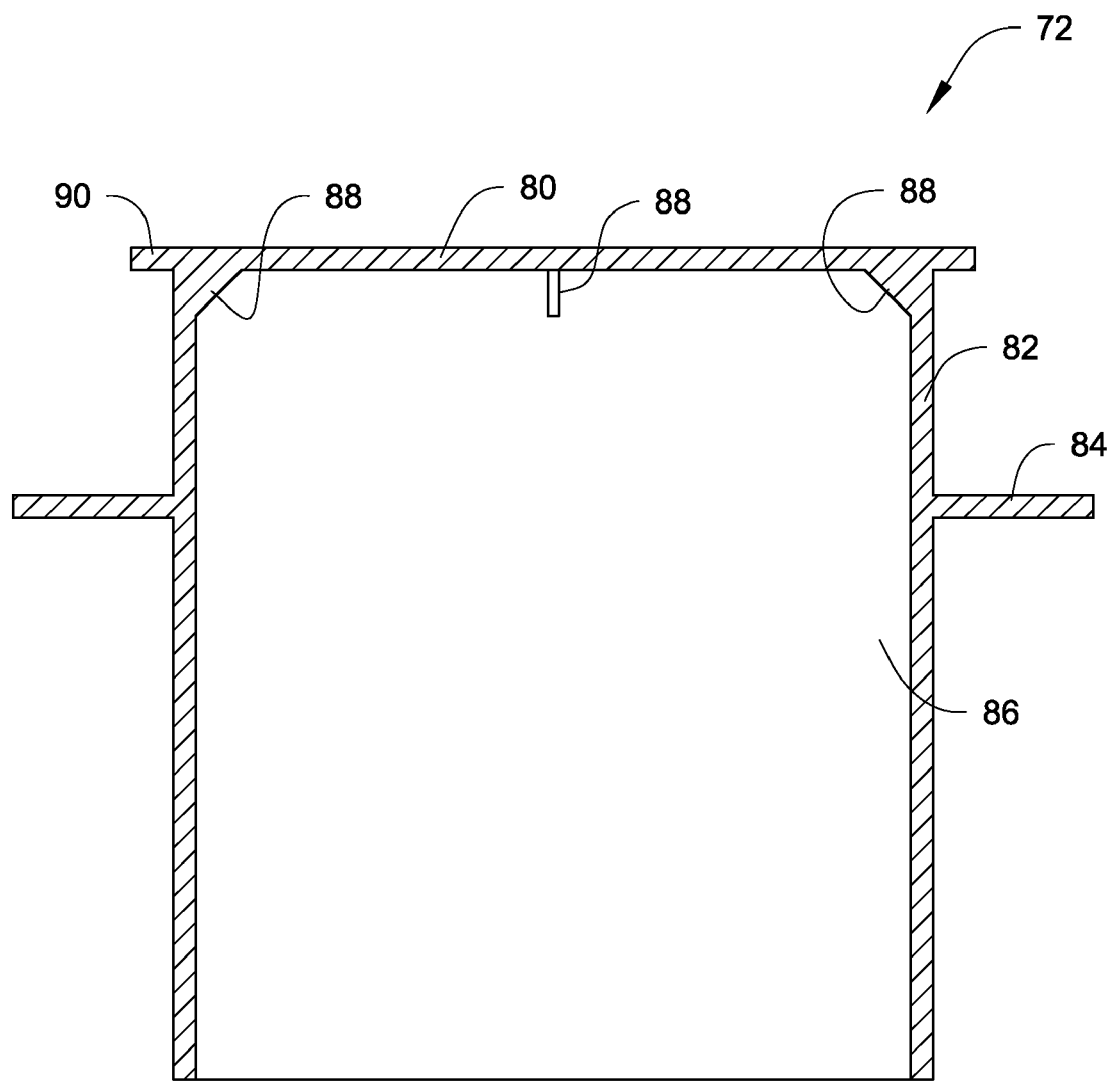
FIG. 4 is a cross-sectional view of the outer filter upper end plate.

The upper end plate 72, as illustrated in FIGS. 3 and 4, includes a first generally circular, horizontal plate 80. A flange 82 extends downwardly from the plate 80, and a generally horizontal ring 84 is connected to the flange 82 intermediate the ends of the flange and extends outwardly from the flange. The bottom surface of the ring 84 is suitably attached to the upper end of the filter media 70, for example using an adhesive or using heat to fuse the ring 84 to the filter media.

The plate 80 and the flange 82 define a hollowed-out area 86 that receives the end of the inner filter 60 as shown in FIG. 3. This permits use of a longer inner filter to increase the amount of filter media for filtering. Deformable ribs 88 are connected to the interior of the end plate 72 within the area 86, extending between an interior surface of the plate 80 and an interior surface of the flange 82. When the inner filter 60 is installed into the outer filter 62, the upper end plate 66 engages the ribs 88. Continued installation causes the ribs 88 to crush, ensuring a tight radial and axial connection between the upper end plate 66 and the upper end plate 72 to prevent relative axial and radial movement between the upper end of the filter 60 and the upper end plate 72 when the filters 60 and 62 are assembled. This prevents relative axial and radial motion between the inner and outer filters after the filters 60, 62 are assembled. Relative motion can cause a rattling noise which is sometimes perceived as a low quality filter. However, the inner filter 60 can rotate relative to the outer filter 62 as will be described below.

Figure 8:
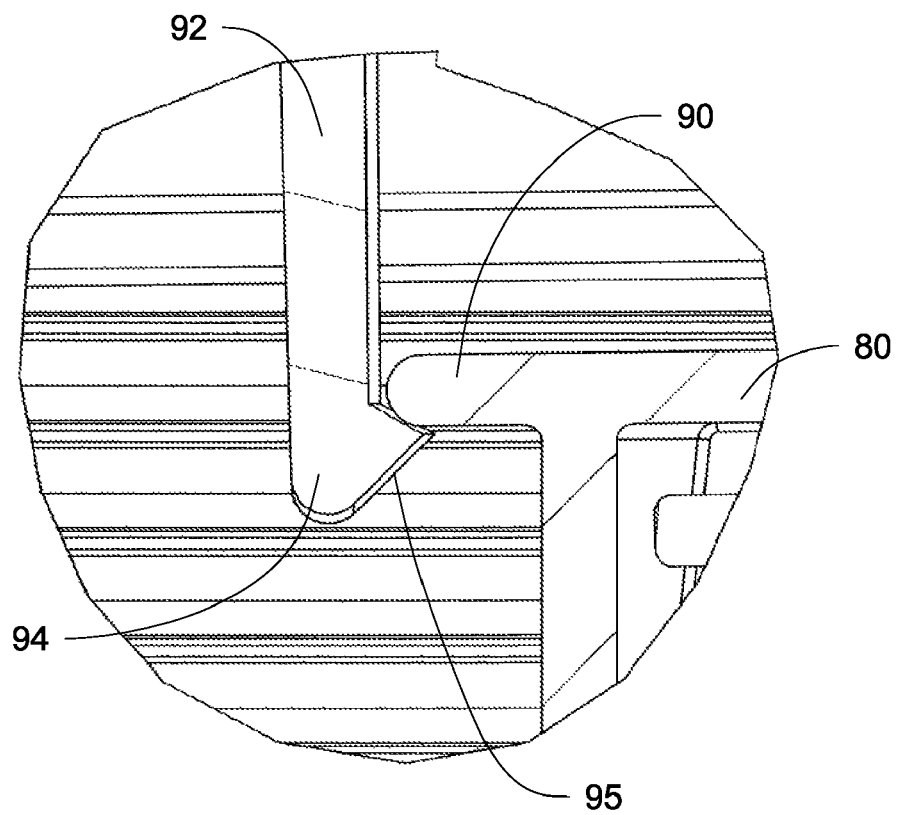
FIG. 8 is a close-up, detailed view showing a finger on the lid engaging the lip.

With reference to FIGS. 1, 4 and 8, the edge of the plate 80 extends past the flange 82 to form a circumferential lip 90. A mechanism is provided for connecting the lid 22 to the filter cartridge 14 via the end plate 72. In particular, a plurality of resilient fingers 92 project downwardly from the lid 22. Each finger 92 includes an enlarged end 94 by which the fingers 92 snap fit over the lip 90. The end 94 includes an angled deflection surface 95 that engages the lip 90 when connecting the lid 22 to the cartridge 14 to cause the finger 92 to deflect radially to clear the lip 90. The lid 22 also includes internal threads (not shown) which engage with external threads (not shown) formed at the upper end of the side wall 16 by which the lid 22 can be screwed onto the housing body.

In use, the filter cartridge 14 can be connected to the lid 22 prior to inserting the cartridge into the housing, after which the lid 22 is threaded onto the side wall 16. The fingers 92 can slide relative to the outer edge of the lip 90 to allow the lid 22 to rotate relative to the upper end plate 72. Alternatively, the cartridge 14 can first be installed in the housing, and thereafter the lid 22 connected to the cartridge via the fingers 92 and the lid 22 threaded onto the wall 16. Removal of the lid 22 occurs by unscrewing the lid and lifting the lid and cartridge 14 together from the housing. As the lid 22 is lifted upward, the ends 94 of the fingers 92 engage the lip 90, causing the cartridge 14 to be lifted upwards as well. The cartridge 14 can then be removed from the lid 22 by manually deflecting the ends of the fingers 92 outward to disengage from the lip 90.

If desired, a handle can be attached to the upper surface of the plate 80 to facilitate handling of the cartridge 14, for example lifting of the cartridge from the housing. However, the lip 90 also provides a means to allow a user to grab the cartridge 14 and lift it from the housing. Therefore, the handle is optional.

Figure 5:
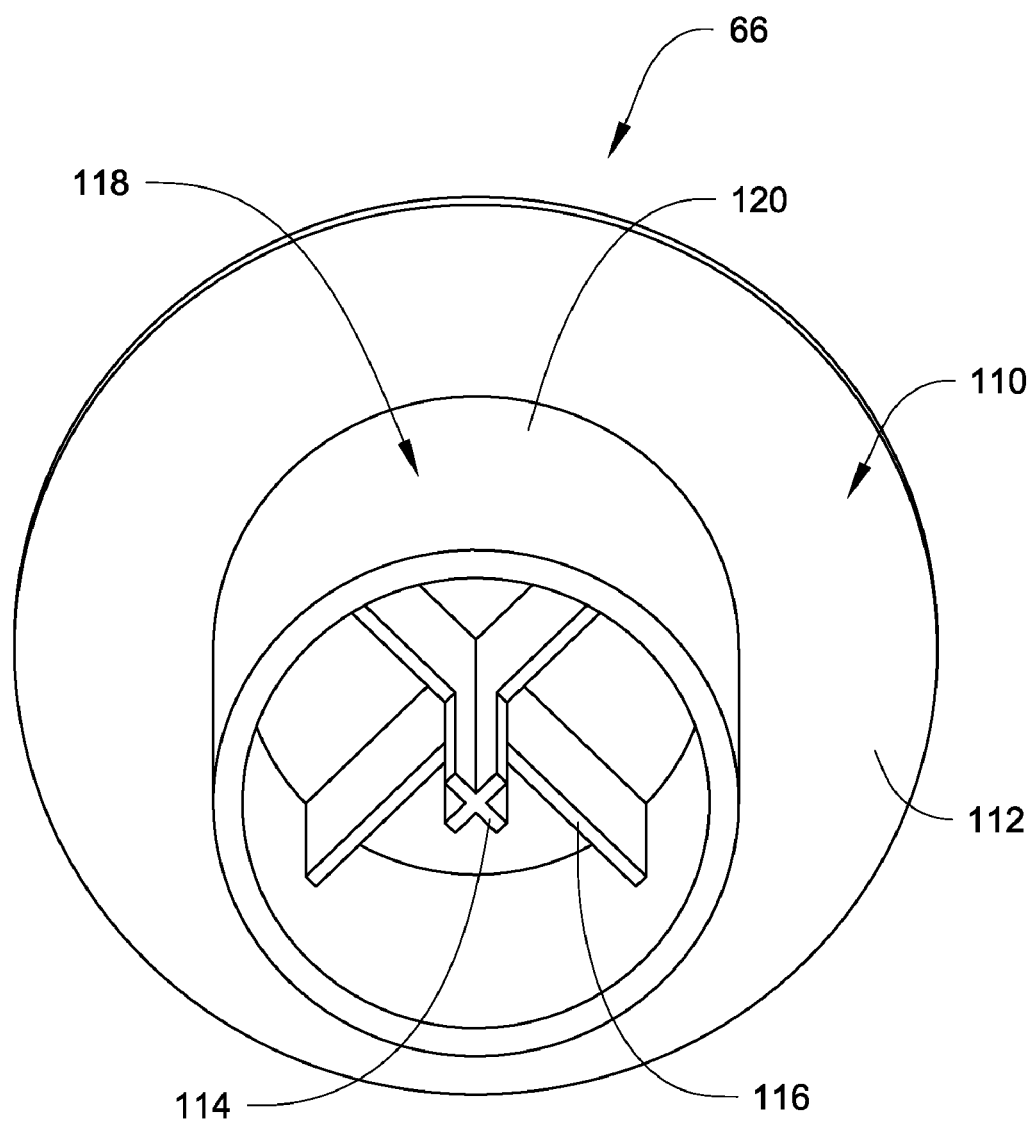
FIG. 5 is a perspective view of the inner filter upper end plate.

Turning to FIGS. 3 and 5, the upper end plate 66 of the inner filter 60 includes a generally circular, horizontal plate 110. The plate 110 includes a perimeter portion 112 that is suitably attached to the upper end of the filter media 64, for example using an adhesive or using heat to fuse portion 112 to the filter media. A pin 114 projects downwardly from the center of the plate 110. The pin 114 is designed to interact with the valve 50 in the manner described in U.S. Pat. No. 6,884,349 and in U.S. patent application Ser. No. 11/780,176. The pin 114 is connected to the plate 110 via four stiffening ribs 116 which provide stiffening to the pin 114.

Extending downward from the plate 110, and surrounding the pin 114 and ribs 116, is a protective skirt 118. The skirt 118 is illustrated as being substantially solid from one end to the other, and the base 120 of the skirt 118 that is connected to the plate 110 and to the ends of the ribs 116. If considered appropriate, holes or other flow enhancing means can be provided in the skirt 118 to facilitate the flow of fuel past the skirt and into the standpipe 30.

Figure 6A:
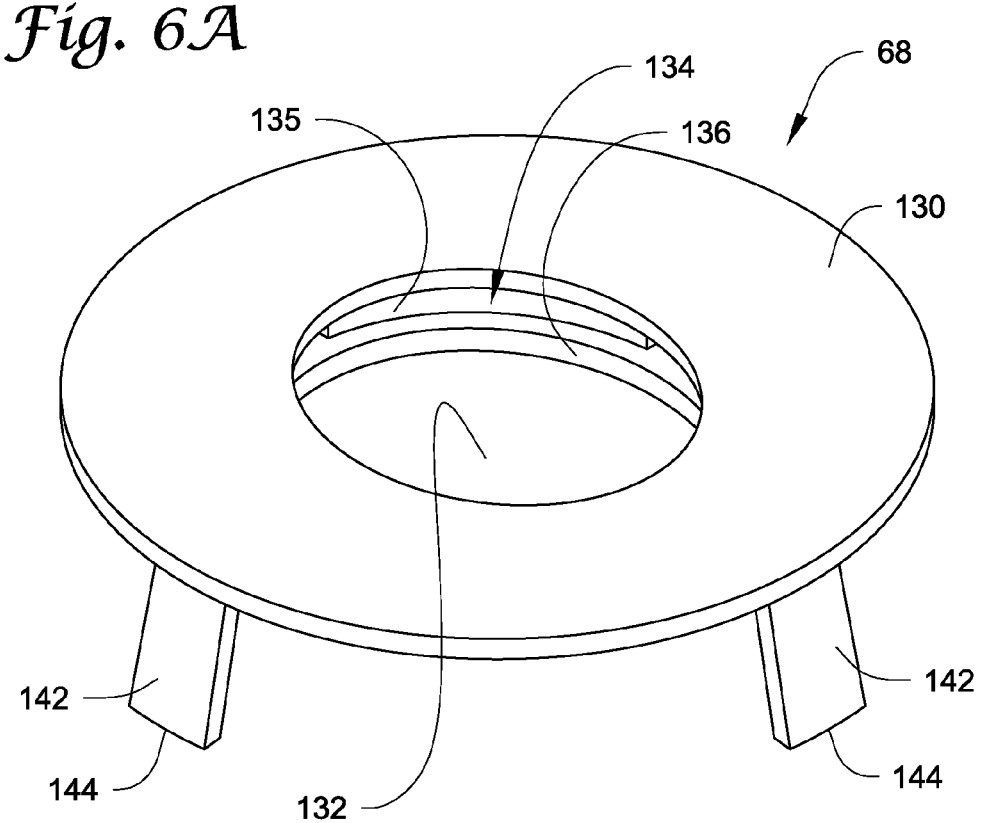
FIGS. 6A and 6B are perspective and side cross-sectional views, respectively, of the inner filter lower end plate.
Figure 6B:
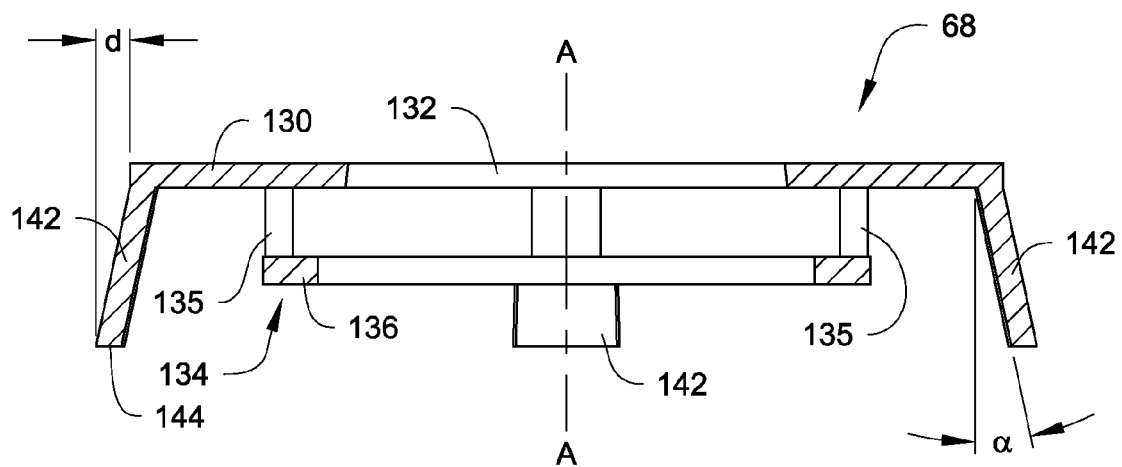

The lower end plate 68 of the inner filter 60 is illustrated in FIGS. 3, 6A and 6B. The end plate 68 includes a generally ring shaped, horizontal plate 130 which is suitably attached to the bottom end of the filter media 64, for example using an adhesive or using heat to fuse the plate 130 to the filter media. A standpipe hole 132 is formed at the center of the plate 130 which is configured to allow passage of the standpipe 30. In the illustrated embodiment, the hole 132 is has a shape similar to the shape of the standpipe 30, for example oval. However, if the standpipe has a different shape, for example circular, then the hole 132 can have a shape, for example circular, similar to the shape of the standpipe.

A seal support 134, for example a flange, extends downwardly from the plate 130 for supporting a seal 138 (visible in FIG. 3) designed to seal with the outside surface of the standpipe 30 when the filter cartridge is installed. The support 134 can extend around the entire perimeter of the hole 132, or only around portions thereof. In the illustrated embodiment, the seal support 134 comprises a plurality of spaced tabs 135 connected to the bottom surface of the plate 130, and a ring-shaped ledge 136 at the base of the tabs 135 for supporting the bottom of the seal 138.

The seal 138 can have any shape suitable for sealing with the outside of the standpipe. For example, in the case of an oval shaped standpipe, the seal can be oval shaped; for a circular standpipe, the seal can be circular. In addition, the seal 138 can be secured to the support 134 in any suitable manner. For example, the seal 138 can be securing to the support 134 by interference fit, adhesives, etc.

A plurality of flexible connection arms 142 are connected to the bottom of the plate 130 near the outer edge thereof, and extend downwardly from the plate 130 at an angle α, for example 20 degrees. The arms 142 can be, in the illustrated example, positioned at equally spaced intervals around the plate, although the spacing could be other than equal. In addition, in the illustrated embodiment there are four arms 142, although a larger or smaller number of arms 142 could be used. The arms 142 each extend an angle so that ends 144 of the arms are positioned radially beyond the outer edge of the plate 130 a distance "d" (FIG. 6B). The arms 142 also help create a gap between the filter media 64, 70.

Figure 7:
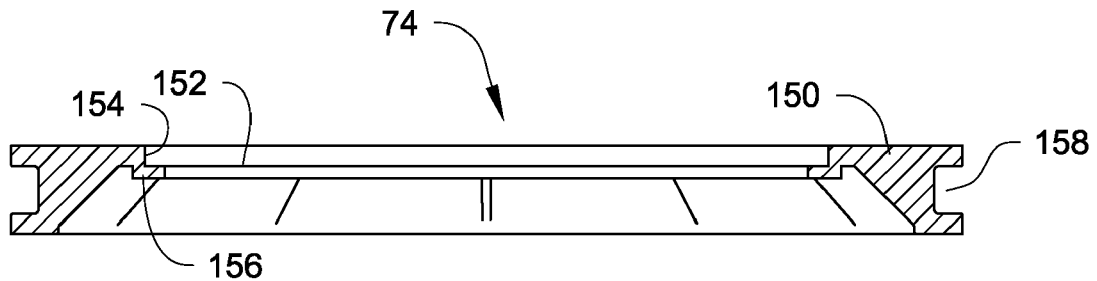
FIG. 7 is a cross-sectional view of the outer filter lower end plate.

The arms 142 are used to help connect the lower end plate 68 of the inner filter 60 to the lower end plate 74 of the outer filter 62. The end plate 74, illustrated in FIGS. 3 and 7, includes a generally ring-shaped, horizontal plate 150 which is suitably attached to the bottom end of the filter media 70, for example using an adhesive or using heat to fuse the plate 150 to the filter media. The plate 150 surrounds a hole 152 through which the inner filter 60 can be inserted into the outer filter 62. The hole 152 is defined by a flange 154 that extends downwardly from the plate 150 around the entire perimeter of the hole 152 to help define the hole.

An inwardly extending ledge 156 is formed at the base of the flange 154. The ledge 156 forms a seat to receive the ends of the arms 142 of the lower end plate 68 of the inner filter 60 thereon as seen in FIG. 3. The outer diameter formed by the ends of the arms 142 is preferably greater than the inner diameter of the inner edge of the ledge 156 so that the arms 142 are compressed inward as the inner filter 60 is inserted into the outer filter 62. Once the ends of the arms 142 clear the ledge 156, the ends 144 spring outward to the position shown in FIG. 3. Thus, the design of the arms 142, the flange 154 and the ledge 156 form a snap fit connection between the filters 60, 62. The crush ribs 88 and the snap fit connection permits relative rotational movement between the outer filter 62 and the inner filter 60 about the central axis A-A to permit alignment of the opening 132 with the standpipe 30. Although the snap fit connection has been described as being between the end plates 68, 74, the snap fit connection could be between the end plates 66, 72, or between other parts of the filters 60, 62.

Returning to FIG. 7, a cut-out 158 is formed around the outer perimeter of the flange 154 of the lower end plate 74. The cut-out 158 receives a seal 160 therein (FIG. 3) that is designed to seal with an interior surface of the side wall 16 of the housing as shown in FIG. 1.

The filter cartridge 14 interacts with and actuates the valve 50 in the manner described in U.S. Pat. No. 6,884,349 and U.S. patent application Ser. No. 11/780,176. However, the concepts described herein can be used in other manners and in technologies other than fuel filtration.

The invention may be embodied in other forms without departing from the spirit or novel characteristics thereof. The embodiments disclosed in this application are to be considered in all respects as illustrative and not limitative. The scope of the invention is indicated by the appended claims rather than by the foregoing description; and all changes which come within the meaning and range of equivalency of the claims are intended to be embraced therein.

The invention claimed is:

1. A filter cartridge, comprising:
an outer filter that includes first filter media with a first end and a second end, a first end plate connected to the first end of the first filter media, and a second end plate connected to the second end of the first filter media, the outer filter including a central axis;
the first end plate includes a generally circular, horizontal plate that is closed so that the generally circular, horizontal plate is without openings therethrough, and a flange that is integrally formed with the generally circular, horizontal plate and that extends toward the second end plate, the flange has a first end connected to the generally circular, horizontal plate and a second end spaced from the first end, the generally circular, horizontal plate and the flange defining an open area, and the generally circular, horizontal plate has a radially outermost perimeter edge that extends radially past the flange to define a lip;
the first end plate further includes a generally horizontal ring that is integrally formed with the generally circular, horizontal plate and the flange, the generally horizontal ring is spaced from the generally circular, horizontal plate in a direction toward the second end plate so that there is an unfilled gap between the lip and the generally horizontal ring, and the generally horizontal ring includes a surface that faces in a direction toward the second end plate and that is attached to the first end of the first filter media; and
an inner filter that includes second filter media with a first end and a second end, a first end plate connected to the first end of the second filter media, and a second end plate connected to the second end of the second filter media; wherein the second filter media is disposed within the first filter media, and the first end plate of the inner filter and the first end of the inner filter are disposed within the open area.

2. The filter cartridge of claim 1, wherein the second filter media is coaxial to the first filter media.

3. The filter cartridge of claim 2, wherein the flange is generally circular and has a diameter, and the lip has a diameter greater than the diameter of the flange.

4. A combination comprising:
 a filter cartridge including:
  an outer filter including first filter media with a first end and a second end, a first end plate connected to the first end of the first filter media, and a second end plate connected to the second end of the first filter media, the outer filter including a central axis;
  the first end plate includes a generally circular, horizontal plate that is closed so that the generally circular, horizontal plate is without openings therethrough, and a flange that is integrally formed with the generally circular, horizontal plate and that extends toward the second end plate, the flange has a first end connected to the generally circular, horizontal plate and a second end spaced from the first end, the generally circular, horizontal plate having a radially outermost perimeter edge that extends radially past the flange to define a lip; and the first end plate further includes a generally horizontal ring that is integrally formed with the generally circular, horizontal plate and the flange, the generally horizontal ring is spaced from the generally circular, horizontal plate in a direction toward the second end plate so that there is an unfilled gap between the lip and the generally horizontal ring, and the generally horizontal ring includes a surface that faces in a direction toward the second end plate and that is attached to the first end of the first filter media; and
 an inner filter that includes second filter media with a first end and a second end, a first end plate connected to the first end of the second filter media, and a second end plate connected to the second end of the second filter media; wherein the second filter media is disposed within the first filter media;
 a filter housing lid that includes a plurality of resilient fingers that project therefrom at respective positions for engagement with the lip on the first end plate of the outer filter to enable connection of the lid to the outer filter.

5. The combination of claim 4, wherein the second filter media is coaxial to the first filter media.

6. The combination of claim 5, wherein the flange is generally circular and has a diameter, and the lip has a diameter greater than the diameter of the flange.

7. The combination of claim 5, wherein the fingers and the lid are rotatable relative to the first end plate of the outer filter.

8. An upper end plate of a filter assembly, comprising:
 a generally circular, horizontal plate that is closed so that the generally circular, horizontal plate is without openings therethrough;
 a flange that is integrally formed with the generally circular, horizontal plate and that extends away from the generally circular, horizontal plate, the flange has a first end connected to the generally circular, horizontal plate and a second end spaced from the first end, the generally circular, horizontal plate and the flange defining an open area that in use receives an end of an inner filter;
 a generally horizontal ring that is integrally formed with the generally circular, horizontal plate and the flange, the generally horizontal ring is spaced from the generally circular, horizontal plate in a direction toward the second end of the flange so that there is an unfilled gap between the lip and the generally horizontal ring, and the generally horizontal ring includes a surface that faces in a direction away from the generally circular, horizontal plate that in use is attached to a filter media; and
 the generally circular, horizontal plate has a radially outermost perimeter edge that extends radially past the flange to define a lip.

9. The upper end plate of claim 8, wherein the flange is generally circular and has a diameter, and the lip has a diameter greater than the diameter of the flange.

\* \* \* \* \*